US008136663B2

(12) United States Patent
Foster (10) Patent No.: US 8,136,663 B2
(45) Date of Patent: Mar. 20, 2012

(54) RECEIVER HITCH CARRIER

(76) Inventor: Mike C. Foster, Osakis, MN (US)

( * ) Notice: Subject to any disclaimer, the term of this patent is extended or adjusted under 35 U.S.C. 154(b) by 210 days.

(21) Appl. No.: 12/109,749

(22) Filed: Apr. 25, 2008

(65) Prior Publication Data

US 2008/0264991 A1   Oct. 30, 2008

Related U.S. Application Data

(60) Provisional application No. 60/913,920, filed on Apr. 25, 2007.

(51) Int. Cl.
   *B65D 85/20* (2006.01)
(52) U.S. Cl. .................. 206/488; 206/565; 206/477
(58) Field of Classification Search .................. 206/486, 206/488, 495, 477, 557, 560, 562, 563, 443, 206/379, 373; 224/519, 403, 404, 405; 211/4, 211/116, 126.1; 280/504, 507, 491.5; 248/536, 248/519, 528, 514, 512, 520, 538
See application file for complete search history.

(56) References Cited

U.S. PATENT DOCUMENTS

| 545,385 | A | * | 8/1895 | Simpson | 248/513 |
|---|---|---|---|---|---|
| 2,736,426 | A | * | 2/1956 | Hamilton | 206/379 |
| 2,883,133 | A | * | 4/1959 | Zarate | 248/517 |
| 3,564,662 | A | * | 2/1971 | Dold | 422/300 |
| 4,643,316 | A | * | 2/1987 | Hoffmann | 209/702 |
| 5,156,110 | A | * | 10/1992 | Fuller | 116/173 |
| 5,207,406 | A | * | 5/1993 | Stine et al. | 248/514 |
| 5,427,346 | A | * | 6/1995 | Urgola | 248/519 |
| 5,458,409 | A | * | 10/1995 | Sheng | 312/216 |
| 5,544,744 | A | * | 8/1996 | Oman | 206/319 |
| 5,682,998 | A | * | 11/1997 | McCoy et al. | 206/485 |
| 5,913,673 | A | * | 6/1999 | Womac | 43/54.1 |
| 6,089,246 | A | * | 7/2000 | Barnes | 135/88.06 |
| 6,279,744 | B1 | * | 8/2001 | Yu | 206/372 |
| 6,832,709 | B2 | | 12/2004 | Henry et al. | 224/403 |
| 6,889,953 | B2 | * | 5/2005 | Harbaugh | 248/519 |
| 7,021,643 | B1 | * | 4/2006 | Buchanan | 280/416.1 |
| 7,055,844 | B1 | * | 6/2006 | Bostedt | 280/491.5 |
| 7,328,797 | B2 | * | 2/2008 | Lin | 206/379 |
| 7,566,067 | B1 | * | 7/2009 | Alexander | 280/415.1 |
| 7,661,543 | B1 | * | 2/2010 | Townsend | 211/4 |
| 2002/0017770 | A1 | * | 2/2002 | Parrish | 280/480.1 |
| 2003/0057676 | A1 | * | 3/2003 | Griggs et al. | 280/504 |
| 2006/0220347 | A1 | * | 10/2006 | Witchey | 280/507 |

OTHER PUBLICATIONS

Dodge and Ford 99-06 Hitch Holster 2 Ball Storage Unit. Retrieved Apr. 23, 2008 printed eBay Incorporated (2008), http://cgi.ebay.com/ebaymotors/ws/eBayISAPI.dll?ViewItem&item=250031612104&ru=http%3A%2F%2Fmotors.shop.ebay.com%3A80%2F_%3F_from%3DR40%26_trksid%3Dm39%26_nkw%3D250031612104%26_nd1%3D%26_fvi%3D1.
Feb. 6, 2007 Dodge Ram Bolt on Hitch Holster Tow Hook Lock. Printed Apr. 23, 208 from eBay Incorporated(2008), http://cgi.ebay.com/ebaymotors/ws/eBayISAPI.dll?ViewItem&item=150229838165&ru=http%3A%2F%2Fmotors.shop.ebay.com%3A80%2F_%3F_from%3DR40%26_trksid%3Dm39%26_nkw%3D150229838165%26_nd1%3D%26_fvi%3D1.

* cited by examiner

*Primary Examiner* — Steven A. Reynolds
(74) *Attorney, Agent, or Firm* — David D. Brush; Westman, Champlin & Kelly, P.A.

(57) ABSTRACT

A receiver trailer hitch carrier is provided, which includes a tray and a receiver tube mounted to the tray. The receiver tube is sized to accept a trailer hitch and is oriented at an acute angle relative to horizontal.

12 Claims, 14 Drawing Sheets

RECEIVER HITCH CARRIER

CROSS-REFERENCE TO RELATED APPLICATION

The present application is based on and claims the benefit of U.S. Provisional Patent Application Ser. No. 60/913,920, filed Apr. 25, 2007, the content of which is hereby incorporated by reference in its entirety.

FIELD OF THE DISCLOSURE

The present disclosure relates to towing hitches for vehicles. More particularly, the present disclosure relates to a carrier for storing a receiver hitch when not in use.

BACKGROUND

A receiver hitch, or draw bar, typically includes a rectangular tube with a flat piece of iron welded to it horizontally so that a ball hitch can be mounted on the flat piece. The rectangular tubing of the receiver hitch is slid in a pocket formed by a mating rectangular receiver tube that is welded to a frame of some sort that can be bolted onto the frame of just about any vehicle. When not in use, the hitch is typically withdrawn from the receiver tube and stored in the vehicle.

SUMMARY

An aspect of the disclosure relates to a receiver trailer hitch carrier, which includes a tray and a receiver tube mounted to the tray. The receiver tube is sized to accept a trailer hitch and is oriented at an acute angle relative to horizontal.

An aspect of the disclosure relates to a receiver trailer hitch carrier, which includes a base and a receiver tube. The receiver tube includes sidewalls and first and opposite second ends. The first end is sized to accept a trailer hitch, and the second end is beveled at an acute angle relative to the sidewalls for engaging the base such that the receiver tube extends from the base at the acute angle when mounted to the base.

DETAILED DESCRIPTION OF ILLUSTRATIVE EMBODIMENTS

1. Single Receiver Example

FIGS. 1A-1E, illustrates a perspective, top plan view, side plan view, front end view and back end view, respectively, of a receiver hitch carrier 10 in an assembled state, according to a first example of the disclosure. The dimensions shown in the various figures are in inches. The purpose of carrier 10 is to store a receiver hitch and/or other items when not in use. Carrier 10 can be mounted at any suitable location on a vehicle, trailer, etc. The term receiver hitch as used herein includes, but is not limited to male and female-type trailer hitches and drawbars, for example.

Figures 1A, 1B:
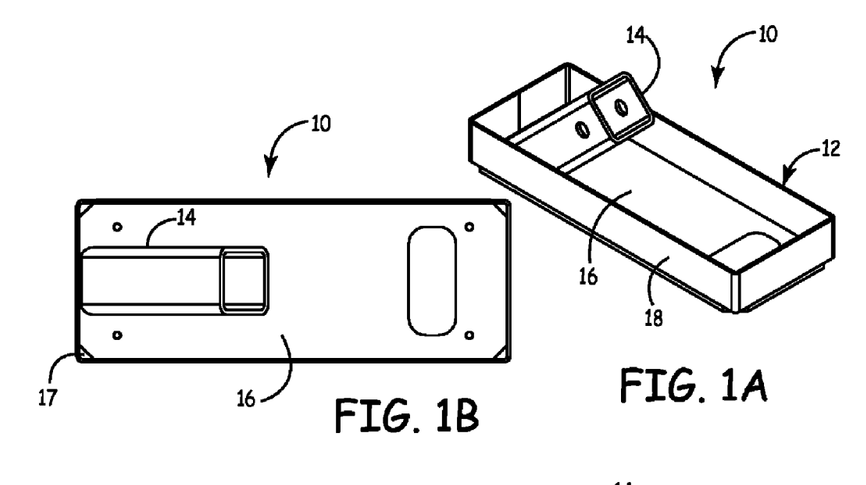
FIG. 1 illustrates a perspective, top plan view, side plan view, and end views of a receiver hitch carrier according to a first example of the disclosure.
Figure 1C:
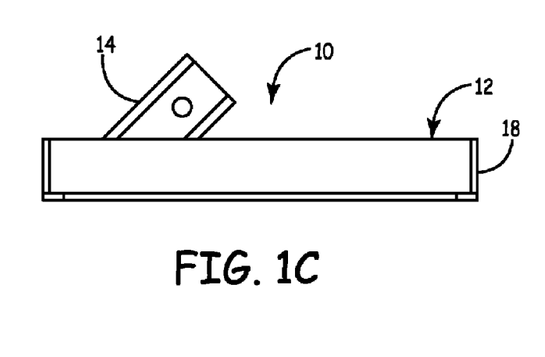
Figure 1D:
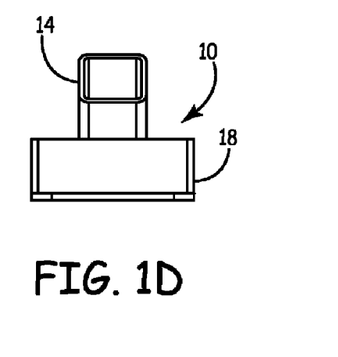
Figure 1E:
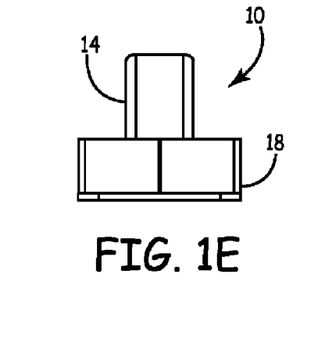

Referring to FIG. 1A, carrier 10 has a tray 12 and a receiver tube 14 mounted to the tray. Tray 12 includes a horizontal base plate 16 and a body 18, which forms sidewalls for the tray. The receiver tube 14 is mounted to the base plate 16 and is sized to form a female-type receiver for receiving a male-type hitch or draw bar for storage. The tray 12 formed by the base plate 16 and the tray body 18 can be used to hold straps, chains, tools, gloves, flashlight or anything that might need to be stored.

The carrier 10 can be mounted just about anywhere on the vehicle that has a substantially flat surface. For example, the carrier can be mounted on the bed of a truck box, between the fender well and the back of the truck box towards the tailgate. It can be mounted either on the right side or on the left side of the truck box. These areas work well because they are out of way from the main storage space along the middle of the truck box and are easy to reach from the tailgate. Other examples of places to mount the carrier include, but are not limited to flatbed trucks, back storage areas of SUV's, or basically anywhere a receiver hitch or draw bar is used.

2. Example of Construction

In one example, carrier 10 is constructed of heavy gauge steel, but other materials of various strengths can be used in other embodiments.

Figure 2A:
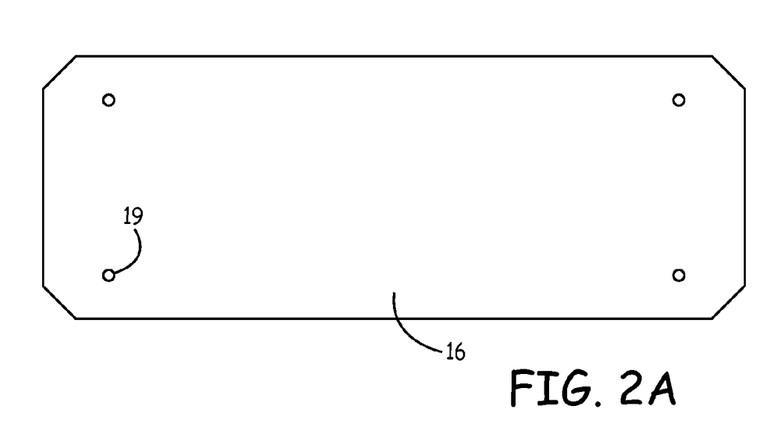
FIG. 2 illustrates a top plan view and a side plan view of a base plate of the carrier shown in FIG. 1.
Figure 2B:
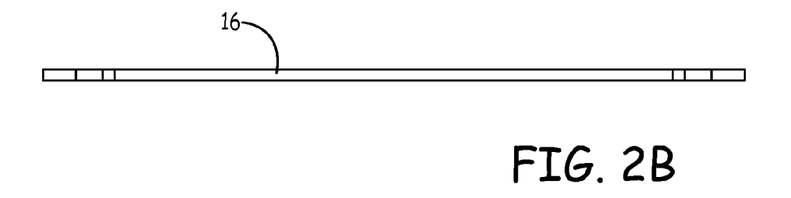

FIGS. 2A and 2B illustrate a top plan view and a side plan view, respectively, of base plate 16 of the carrier shown in FIG. 1. In this example, the base plate 16 is made of a ¼"× 6"×16" HR steel plate with the corners cut at 45 degree angle x 0.750 so that water can run out of the tray. The open corners 17 are shown after assembly in FIG. 1B. Also, base plate 16 has four mounting holes 19. Other dimensions and shapes can be used in alternative embodiments.

Figures 3A, 3B:
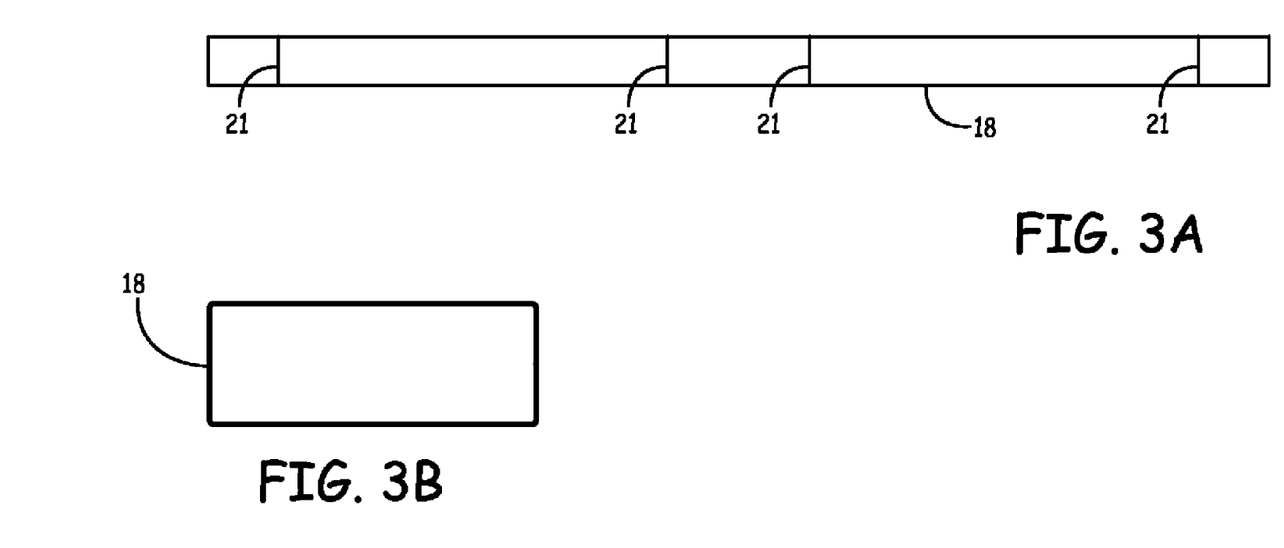
FIG. 3 illustrates a flat pattern view, a top plan view, a side plan view, and an end view of a tray body, which is attached to the base plate in the carrier shown in FIG. 1.
Figure 3C:
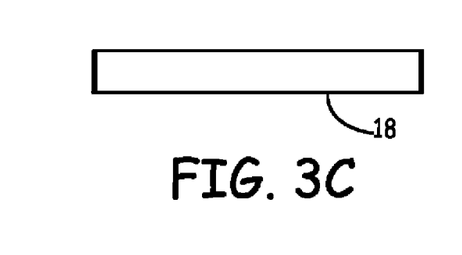
Figure 3D:
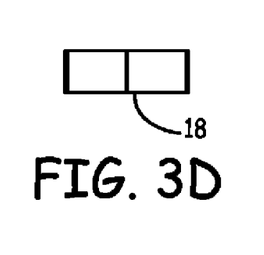

FIGS. 3A-3D illustrate a flat pattern view, a top plan assembled view, a side plan assembled view, and an end plan assembled view of the tray body 18. Tray body 18 is bent along the break lines 21 shown in FIG. 3A to form a generally rectangular box as shown in FIG. 3B-3D. When formed, the ends of the body 18 mate along one end of the body, as shown in FIG. 3D. The ends can be welded together, if desired. The tray body 18 mounts on top of the base plate 16 and is spot welded in several places and is made of 2"×10 gauge flat HR steel. The tray body 18 forms the sidewalls of the carrier that keeps equipment or gear in place. Again, other dimensions and shapes can be used in alternative embodiments.

Figure 4A:
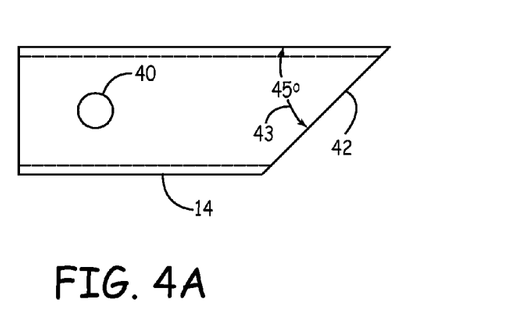
FIG. 4 illustrates a side plan view and an end view of a receiver tube of the carrier shown in FIG. 1.
Figure 4B:
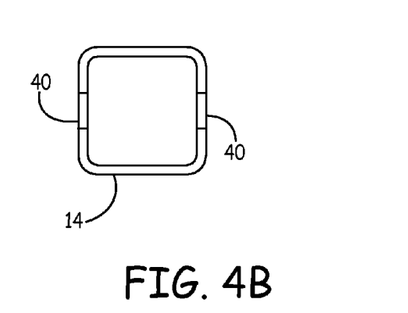

FIGS. 4A and 4B illustrate a side plan view and an end view, respectively, of the female receiver tube 14 that is attached to the base plate 16, such as by welding, as shown in FIG. 1. In one non-limiting example, tube 14 has dimensions of 2.5 inches by 2.5 inches by 3/16 inches, as shown in FIG. 4B. Tube 14 has a length of 7.25 inches, for example, as shown in FIG. 4A. The sidewalls of tube 14 include a pair of opposing holes 40 for accepting a locking pin to hold a receiver hitch in place on the tube. As shown in FIG. 4A, the end 42 of tube 14 that is mounted to base plate 16 forms an angle 43 relative to the sidewalls of tube 14. In one example, angle 43 is approximately 45 degrees.

Thus, in the embodiment shown in FIGS. 1-4, a longitudinal axis of the receiver tube 14 and the sidewalls of the tube are oriented at a 45-degree angle relative to the base plate 16. However, the receiver tube can be mounted at other angles such as at a 90-degree angle or any acute angle. Appropriate bevels can be formed along the end 42 of receiver tube 14. The receiver tube 14 can be located generally along the longitudinal center line of tray 12 towards the back of the base plate 16. The receiver tube 14 holds the receiver hitch or draw bar in place. As shown in FIGS. 1A, 1C, and 4A-4B, the receiver tube 14 has a pair of holes in the middle of the tube for accepting a locking pin. Since the tube is mounted at a 45 degree angle, with the opening of the tube oriented toward the rear of the vehicle, it is easier to install a receiver hitch or draw bar into the tube from the tailgate area of the vehicle. Also, if the receiver tube is mounted such that the opening of the tube is oriented toward the rear of the vehicle, a receiver hitch that is installed into the tube is less likely to come out of the tube if the vehicle's driver slams on the brakes or the vehicle impacts another object.

3. Two-Receiver Example

Figure 5A:
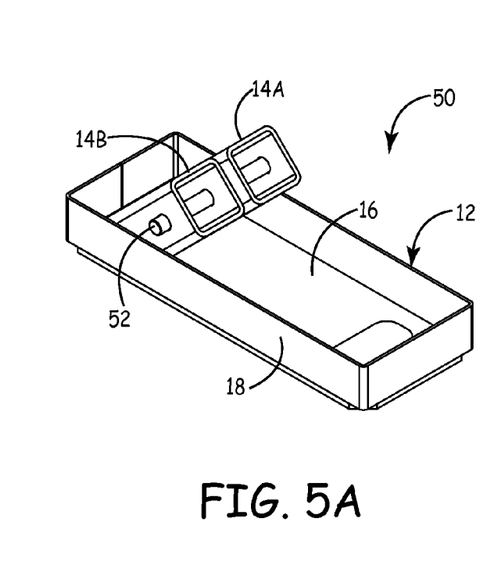
FIG. 5 illustrates a perspective, top plan view, and a side plan view of a receiver hitch carrier according to a second embodiment of the disclosure.
Figure 5B:
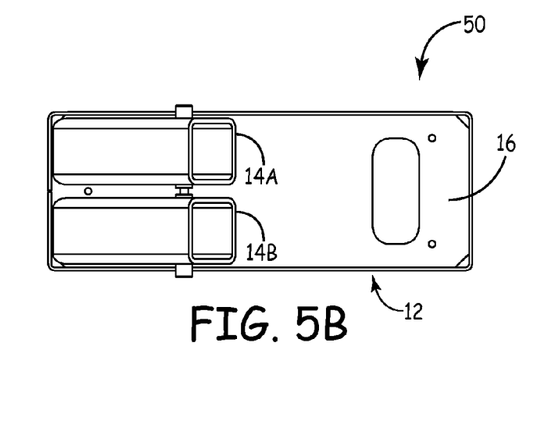
Figure 5C:
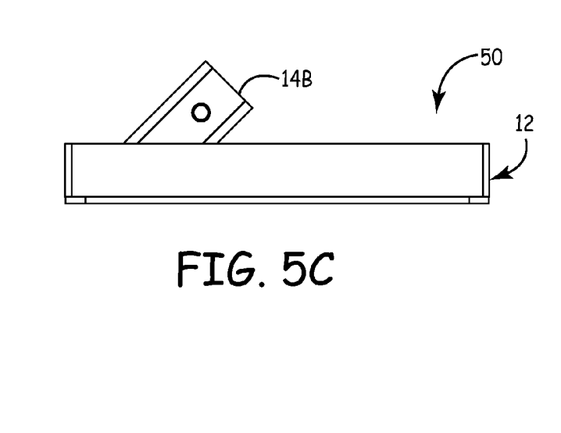

FIGS. 5A-5C illustrate a perspective view, top plan view, and side plan view of a receiver hitch carrier 50 according to a second example of the disclosure that can hold two receiver hitches or draw bars. The same reference numerals are used in FIGS. 5A-5C as were used in the previous figures for the same or similar elements. The example shown in FIGS. 5A-5C is the same as that shown in FIG. 1, except that the first receiver tube 14A is moved over to make room for a second receiver tube 14B, which is also mounted to the base plate 16.

There is also a locking pin 52 that slides into coaxially-aligned holes in the receiver tubes 14A and 14B for locking receiver hitches or draw bars within the receiver tubes. FIGS. 5A and 5B show the locking pin in place (receiver hitches not shown).

Figure 6A:
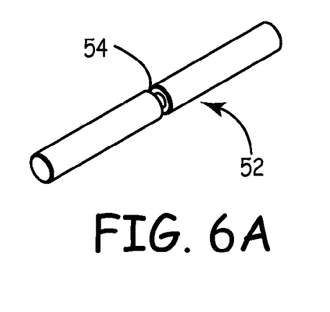
FIG. 6 illustrates a side plan view and an end view of a locking pin for locking receiver hitches in the receiver tubes of the carrier shown in FIG. 5.
Figure 6B:
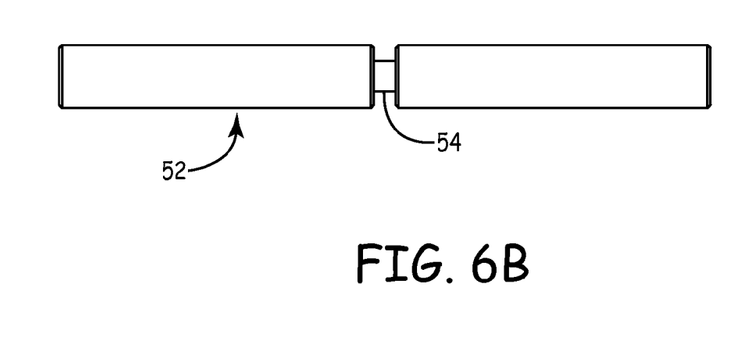
Figure 6C:
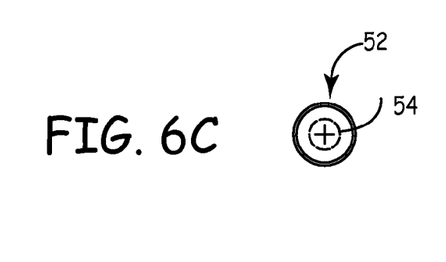

FIGS. 6A-6C illustrate a perspective view, side plan view and end view of the locking pin 52 according to an example of the disclosure. The locking pin 52 has a groove 54 in the middle of the pin for receiving a hairpin cotter pin 70 (shown in FIG. 7) to lock the locking pin in place. This design helps prevent someone from using the locking pin 52 for locking their receiver hitch or draw bar into the towing receiver on their vehicle. In an alternative embodiment, the user can use the locking pin from their towing receiver to lock the hitch or draw bar into the receiver carriers shown in FIGS. 1 and 5.

Figure 7:
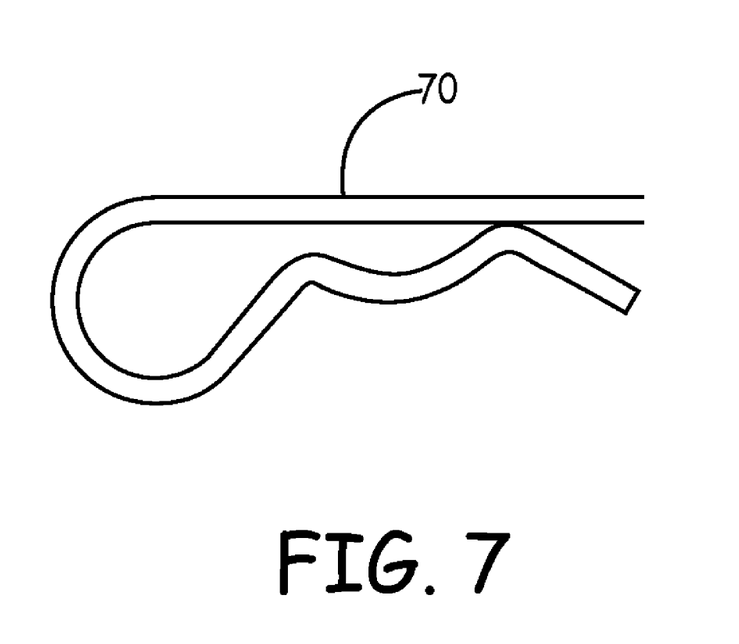
FIG. 7 illustrates a top plan view of a hairpin cotter pin for locking the locking pin shown in FIG. 6 in place.

FIG. 7 illustrates a top plan view of a hairpin cotter pin 70 for locking the locking pin 52 shown in FIG. 6 in place within the receiver tubes 14 shown in FIG. 5.

Figure 8A:
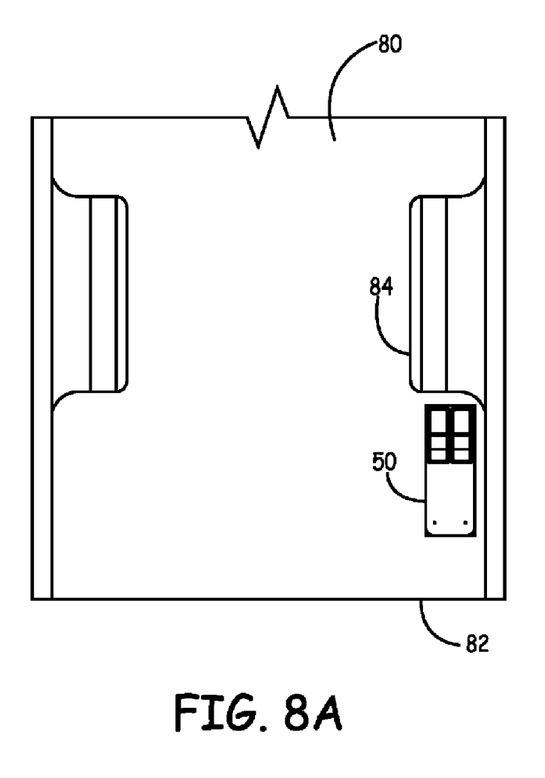
FIGS. 8A and 8B illustrate a top plan view and an end view, respectively, of a truck box and show an example mounting location for the carrier shown in FIG. 5.
Figure 8B:
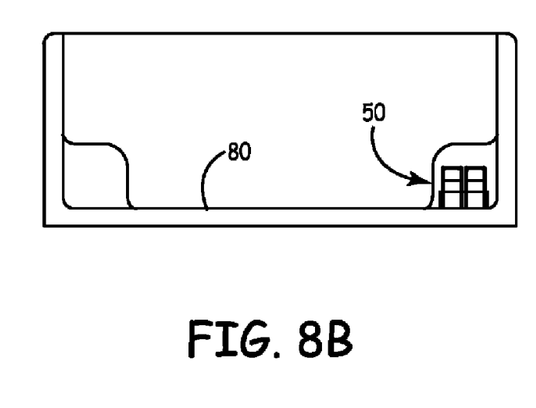

FIGS. 8A and 8B illustrate a top plan view and an end view (as viewed from tailgate 82) of a truck box 80, showing an example mounting location for the carrier 50 shown in FIG. 5. As described above, the carrier 50 can be mounted on the bed of a truck box 80, between fender well 84 and the back of the truck box towards the tailgate 82 as shown in FIG. 8. This area is out of the way from the main storage space along the middle of the truck box 80 and is easy to reach from the tailgate 82.

In one example, the carrier is supplied with size ¼-14×1½ hex washer head self-drilling screws. In a further example, the carrier can be mounted to a vertical wall of the truck box or other vehicle surface through a side wall of the tray body.

4. Further Receiver Carrier Example

Figure 9A:
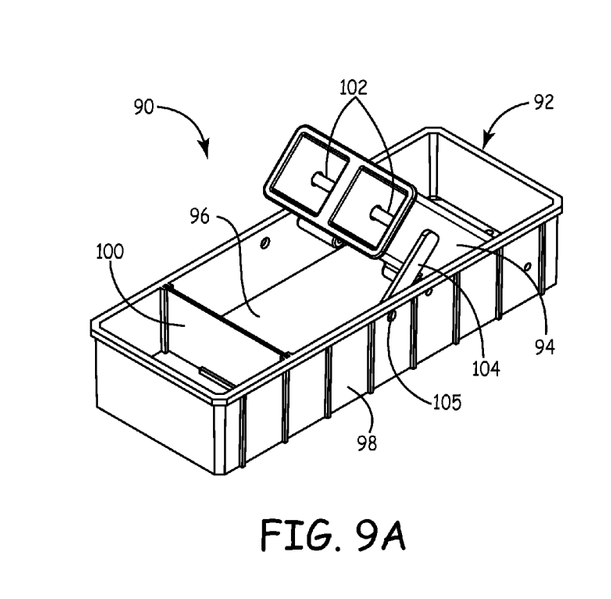
FIG. 9A is a perspective view of a receiver carrier according to a further example of the disclosure.

FIG. 9A is a perspective view of a receiver carrier 90 according to a further example of the disclosure. Carrier 90 is similar to the previously described carriers, but is constructed of glass-filled 6/6 nylon material, which is molded to form the various elements of the carrier.

Carrier 90 includes a tray 92 and a pair of a double-receiver tube 94 attached to the tray 92. Tray 92 includes a base 96 and sidewalls 98 that form a box for supporting the double-receiver tube 94 and storing miscellaneous items. In this example, tray 92 is divided into two compartments by a divider wall 100, which is inserted into retaining slots formed in sidewalls 98 and base 96.

Figure 9B:
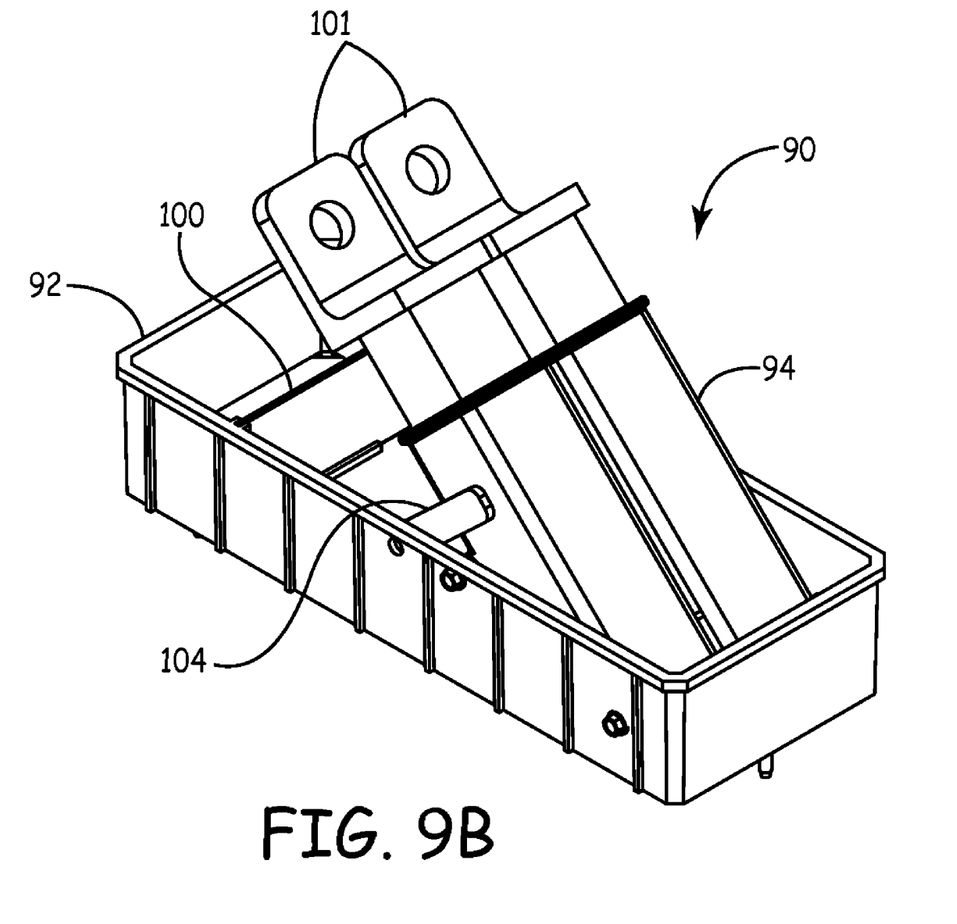
FIG. 9B is a perspective view of the receiver carrier shown in FIG. 9A with two trailer hitches inserted into the carrier.

In this example, the double-receiver tube 94 is formed as a single molded piece having two female-type receivers for accepting two male-type trailer hitches or draw bars 101 (shown in FIG. 9B). The hitches can be locked in place by a locking pin 102, which extends (for example) through both receiver openings and is connected to an arm 104. Once locking pin 102 is inserted into receiver 94, arm 104 is positioned between the receiver 94 and the sidewall 98 to help hold the pin in place. In one example, arm 104 has a small hole at its distal end, which mates with a corresponding hole 105 in sidewall 98. The mating holes are sized to receive the shackle of a padlock, for example. If the user would like to padlock the locking pin in place, the user lifts the arm 104 to mate the hole in the arm with the hole 105 in the sidewall and then inserts the shackle through the mated holes.

Figure 9C:
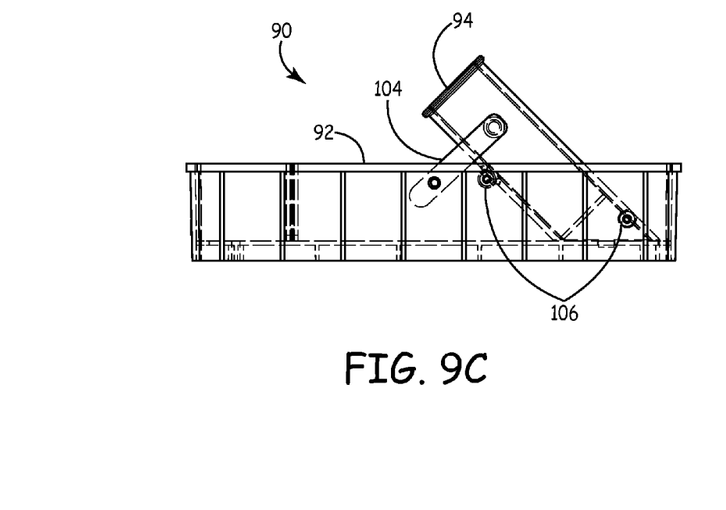
FIG. 9C is a wire frame drawing illustrating a side plan view of the carrier 90 shown in FIGS. 9A and 9B.

FIG. 9C is a wire frame drawing illustrating a side plan view of the carrier 90 shown in FIGS. 9A and 9B. Receiver 94 has a set of four self-taping lug bosses positioned along the side edges of the receiver, two along the top of the receiver and two along the bottom of the receiver, which align with corresponding holes 106 in sidewall 98 when receiver 94 is assembled onto tray 92. During assembly, receiver 94 is positioned between the sidewalls 98. A set of self-tapping screws can then threaded through the holes and into the aligned lug bosses to secure the receiver 94 to the tray 92.

Figure 10A:
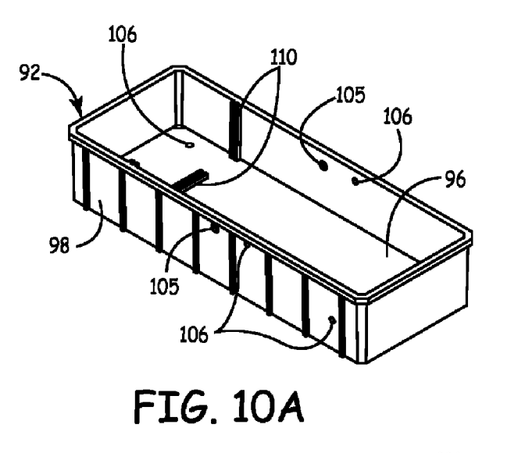
FIGS. 10A and 10B are top and bottom perspective views, respectively, of a tray of the carrier shown in FIGS. 9A-9C.
Figure 10B:
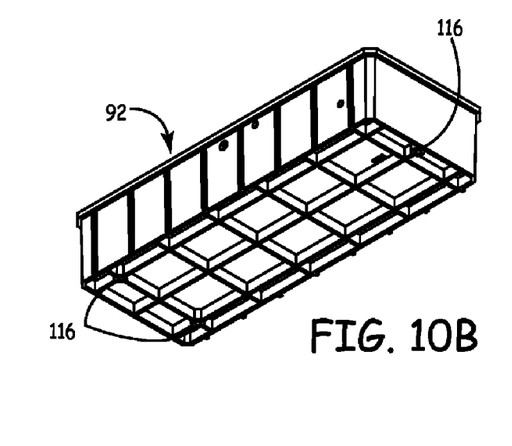
Figure 10C:
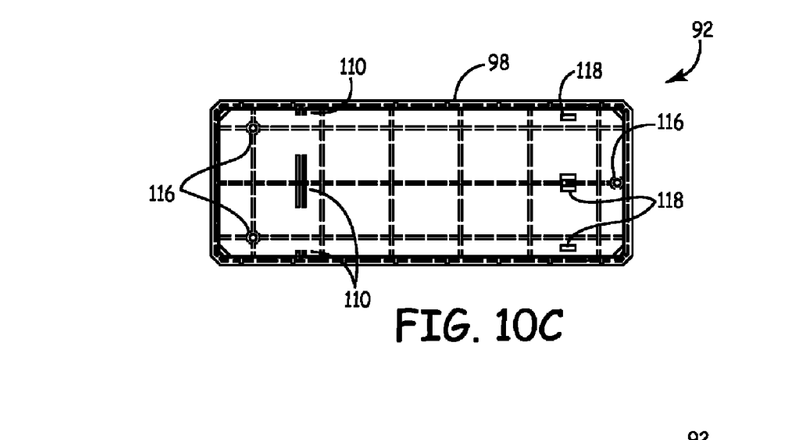
FIGS. 10C and 10D are wire frame drawings illustrating a top plan view and a side plan view, respectively, of the tray.
Figure 10D:
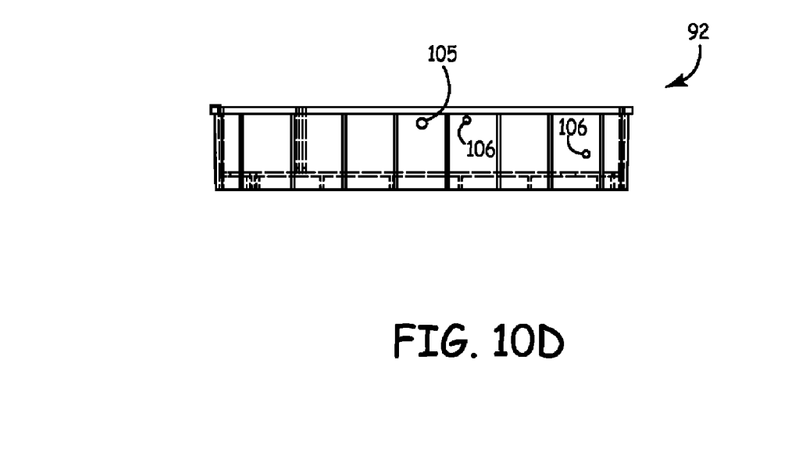

FIGS. 10A and 10B are top and bottom perspective views, respectively, of tray 92 without receiver 94 or divider 100 inserted. FIGS. 10B and 10C are wire frame drawings illustrating a top plan view and a side plan view, respectively, of tray 92. As mentioned above, tray 92 includes a set of retaining slots 110 for accepting the divider 100 (shown in FIG. 9A). The sidewalls 98 include a first set of holes 105 for mating with the hole in locking arm 104, and a second set of holes 106 for mating with the lug bosses of receiver 94. The base 96 of tray 92 also includes a set of mounting holes 116 for mounting the tray to a vehicle, for example. Tray 92 is molded to include a plurality of stiffening ribs on its exterior surfaces, for example.

Figures 11A, 11B, 11C, 11D, 11E:
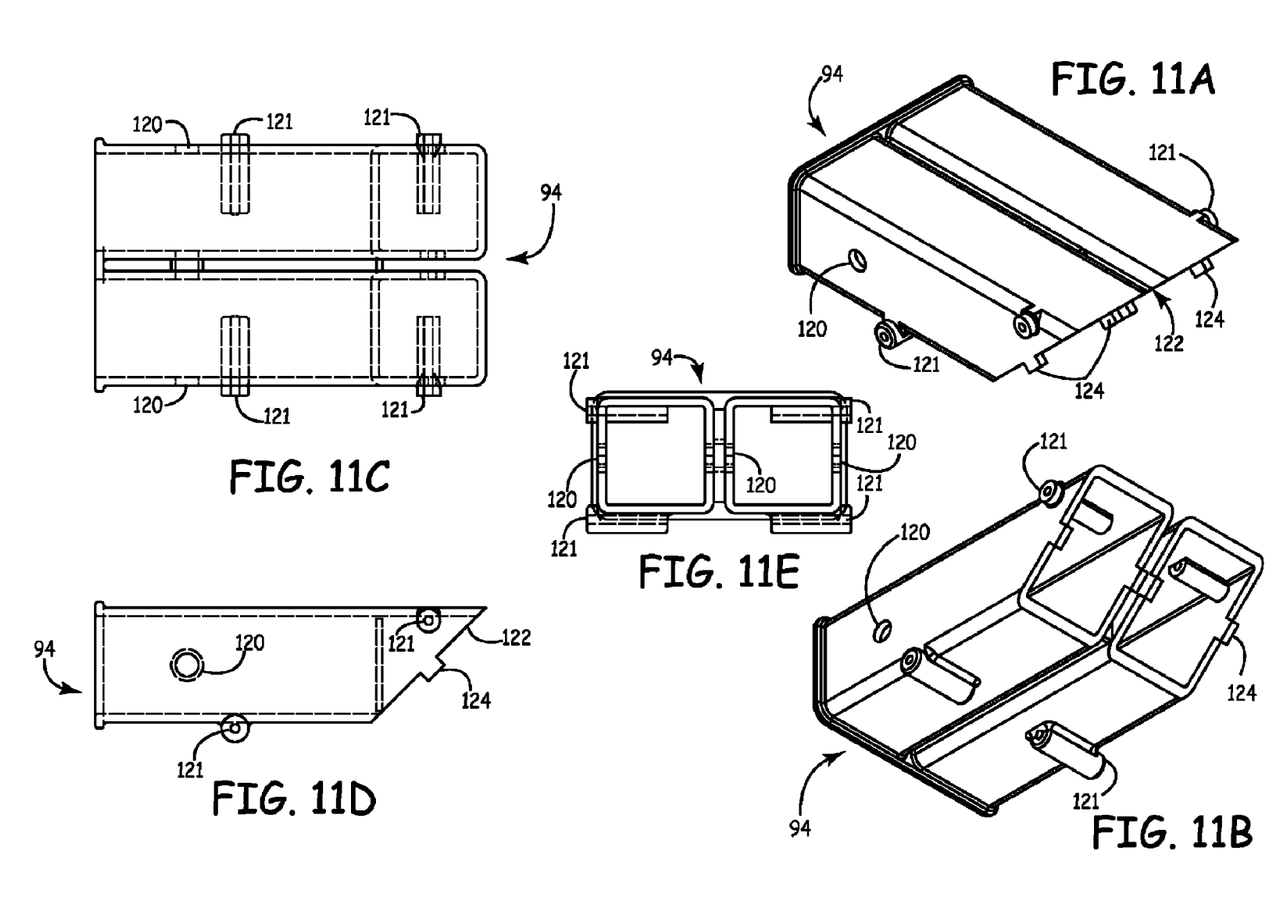
FIGS. 11A and 11B are top and bottom perspective views of a double-receiver tube of the carrier shown in FIGS. 9A-9C.
FIGS. 11C-11E are wire frame drawings illustrating a top plan view, side plan view and end view of the receiver tube shown in FIGS. 11A-11B.

FIG. 10C also shows a set of four mounting openings or slots 118 for accepting corresponding mounting tabs formed on the bottom end of receiver 94 (shown in FIGS. 11A, 11B and 11D).

FIGS. 11A and 11B are top and bottom perspective views of double-receiver tube 94. FIGS. 11C-11E are wire frame drawings illustrating a top plan view, side plan view and end view (as viewed from the openings) of receiver 94. Receiver 94 includes a set of opposing, coaxially-aligned holes 120 for receiving locking pin 102 (shown in FIG. 9A). FIGS. 11A-11E also show in greater detail the set of lug bosses 121 that are formed in receiver 94 for mating with the corresponding holes 106 in the sidewall 98 of tray 92 during assembly.

As mentioned above, receiver 94 has a bottom end 122 formed with four mounting tabs 124 that engage slots 118 (shown in FIG. 10C) in the base 96 of tray 92 during assembly. The mounting tabs help hold receiver 94 in place within the tray.

Figure 12A:
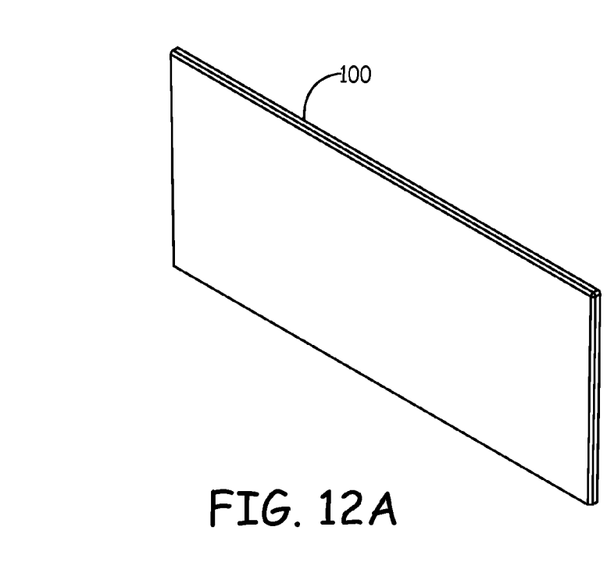
FIGS. 12A-12C illustrate a perspective view, end view and top plan view, respectively, of a divider according to an exemplary aspect of the disclosure.
Figure 12B:
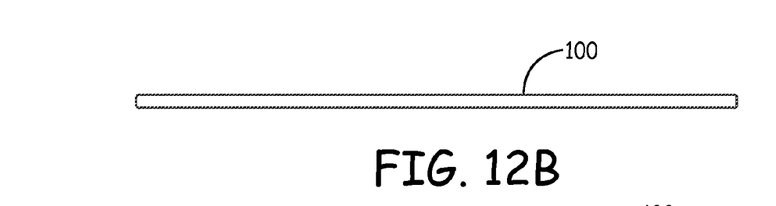
Figure 12C:
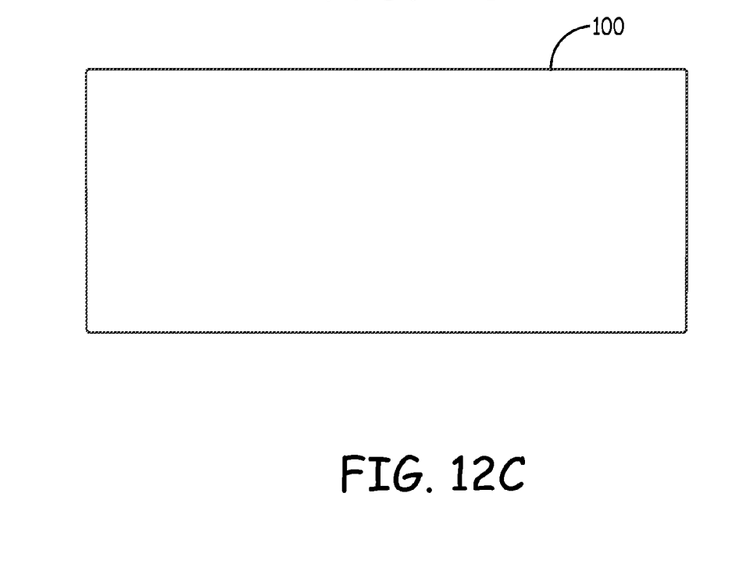
Figure 13A:
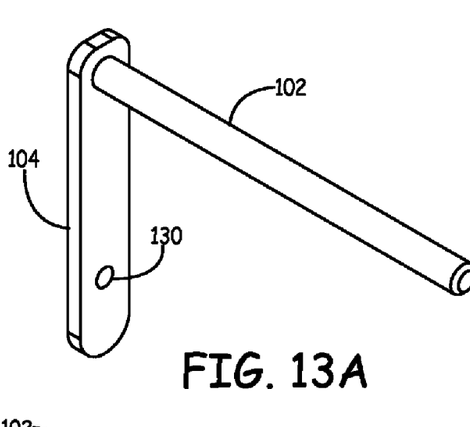
FIGS. 13A-13E illustrate a perspective view, an inside end view, a top plan view, a side plan view, and an outside end view of a locking pin and arm, according to an example of the disclosure.
Figure 13B:
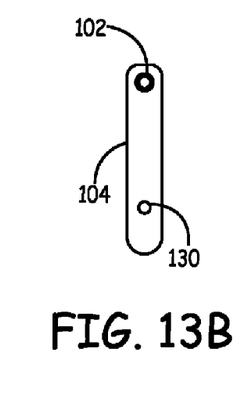
Figure 13C:
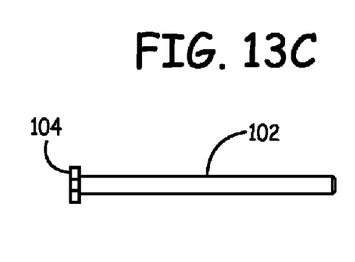
Figure 13D:
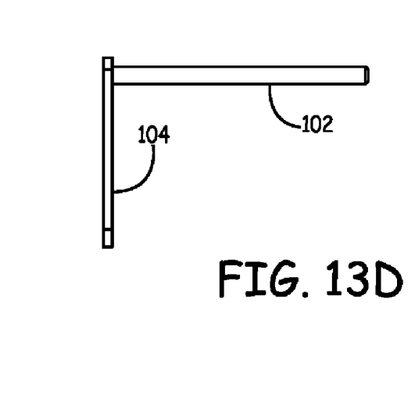
Figure 13E:
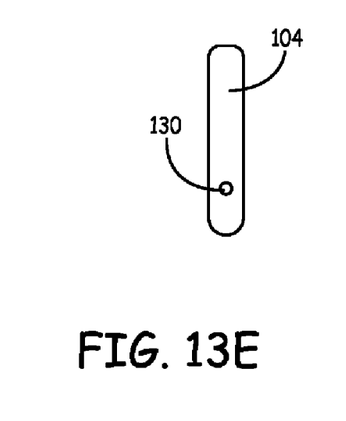

FIGS. 12A-12C illustrate a perspective view, end view and top plan view, respectively, of divider 100 according to an exemplary aspect of the disclosure. In this example, the lower corners of divider are formed with a 91-degree angle, so that the divider can be inserted easily between the sidewalls of the tray, in slots 110, while providing a friction fit.

FIGS. 13A-13E illustrate a perspective view, an inside end view, a top plan view, a side plan view, and an outside end view of locking pin 102 and arm 104, according to one example of the disclosure. In this example, locking pin 102 has a length that is sufficient to pass through both receiver openings and thereby lock two hitches within the carrier. Arm 104 extends downwardly from pin 102, for example at a 90-degree angle, for engaging a sidewall of the carrier. The distal end or arm 104 has a small hole 130 for mating with a corresponding hole 105 in tray 92, for padlocking the pin in the receiver tubes. Other types of locking pins can be used in alternative examples, which may or may not include corresponding alterations to the receiver.

Also, there are many different sizes and shapes of vehicles, so the carrier can be provided in various shapes, sizes and configurations. Any number of receiver tubes can be attached to the carrier (either separately or as a single unit) and in any suitable orientation and angle. The tubes can be mounted to the base plate or to one or more of the tray walls, for example. The tubes can be adapted as female receivers or as male receivers, for example. Other changes can also be made.

Although the present disclosure has been described with reference to one or more embodiments, workers skilled in the art will recognize that changes may be made in form and detail without departing from the spirit and scope of the disclosure and/or the appended claims.

What is claimed is:

1. A receiver trailer hitch carrier comprising:
   a tray comprising a base and sidewalls;
   a receiver tube mounted to the base and extending upwardly from the base, between the sidewalls of the tray, the sidewalls of the tray circumscribing the receiver tube to form a partially enclosed box with the base, wherein the receiver tube is sized to accept a rectangular portion of a trailer hitch and is oriented at an acute angle relative to the base, the receiver tube comprising:
   sidewalls;
   a first end which is rectangular and configured to receive a trailer hitch; and
   a second, opposite end, which is beveled at the acute angle relative to the sidewalls of the receiver tube for engaging the base;
   an additional receiver tube mounted to the base, which is sized to accept a rectangular portion of a trailer hitch and is oriented at the acute angle relative to the base, wherein the first mentioned receiver tube and the additional receiver tube are positioned side-by-side within the tray and each have an opening facing a common end of the tray;
   coaxially-aligned holes in both of the receiver tubes and positioned within the respective receiver tubes to be aligned with corresponding holes in the rectangular portion of a corresponding trailer hitch when the corresponding trailer hitch is received in one of the receiver tubes; and
   a locking pin having a length that is extendable through the coaxially-aligned holes in both the receiver tubes and through the corresponding holes in the rectangular portion of the corresponding trailer hitch when the corresponding trailer hitch is positioned in one of the receiver tubes.

2. The receiver trailer hitch carrier of claim 1, wherein the acute angle is 45 degrees.

3. The receiver trailer hitch carrier of claim 1, wherein the sidewalls of the tray extend along a periphery of the base.

4. The receiver trailer hitch carrier of claim 1, wherein the receiver tubes are welded to the base, along a bottom end of the receiver tubes.

5. The receiver trailer hitch carrier of claim 1, wherein at least one of the receiver tubes comprises at least one tab extending from the second end of the receiver tube, which mates with at least one corresponding slot formed in the base.

6. The receiver trailer hitch carrier of claim 1, wherein at least one of the receiver tubes has a plurality of lug bosses, which mate with corresponding holes in at least one of the sidewalls of the tray and are adapted to accept screws passed through the holes to secure the receiver tube to the tray.

7. The receiver trailer hitch carrier of claim 1 and further comprising a divider, which separates the tray into more than one compartment.

8. The receiver trailer hitch carrier of claim 1 wherein at least one of the receiver tubes is releasably mounted to the tray.

9. The receiver trailer hitch carrier of claim 1 wherein the first mentioned receiver tube and the additional receiver tube are formed as a single part, which is mounted to the tray.

10. The receiver trailer hitch carrier of claim 1, wherein the locking pin comprises a cylindrical pin and an arm extending perpendicularly from the pin, which has a hole that is offset from a longitudinal axis of the pin and mates with a corresponding hole in a sidewall of the tray.

11. A receiver trailer hitch carrier comprising:
    a base;
    a receiver tube comprising:
    side walls;
    a first end, which is rectangular and sized to accept a rectangular portion of a trailer hitch; and
    a second, opposite end, which is beveled at an acute angle relative to the sidewalls of the receiver tube for engaging the base such that the receiver tube extends from the base at the acute angle when mounted to the base; and
    an additional receiver tube mounted to the base, which is sized to accept a rectangular portion of a trailer hitch and is oriented at the acute angle relative to the base wherein the first mentioned receiver tube and the additional receiver tube are positioned side-by-side on the base and each have an opening facing a common end of the base;

coaxially-aligned holes in both of the receiver tubes that are positioned to be aligned with corresponding holes in the rectangular portion of a corresponding trailer hitch when the corresponding trailer hitch is received in one of the receiver tubes; and sidewalls extending along a perimeter of the base, which form a partially enclosed box, wherein the receiver tubes extend upwardly from the base, between the sidewalls of the partially enclosed box.

12. A receiver trailer hitch carrier comprising:

a tray comprising a base and sidewalls;

a receiver tube mounted to the base and extending upwardly from the base, between the sidewalls of the tray, the sidewalls of the tray circumscribing the receiver tube to form a partially enclosed box with the base, wherein the receiver tube is sized to accept a trailer hitch and is oriented at an acute angle relative to the base, the receiver tube comprising:

sidewalls;

a first end adapted to receive a trailer hitch; and a second, opposite end, which is beveled at the acute angle relative to the sidewalls of the receiver tube for engaging the base; and a locking pin that is extendable through locking holes in the receiver tube, wherein the locking pin comprises a cylindrical pin and an arm extending perpendicularly from the pin, which has a hole that is offset from a longitudinal axis of the pin and mates with a corresponding hole in a sidewall of the tray.

* * * * *